United States Patent
Kaliteevskiy et al.

(10) Patent No.: US 12,367,049 B2
(45) Date of Patent: Jul. 22, 2025

(54) QUANTUM COMPUTING SYSTEMS HAVING A RECONFIGURABLE QUANTUM PROCESSING UNIT

(71) Applicant: CORNING INCORPORATED, Corning, NY (US)

(72) Inventors: Nikolay Alekseyevich Kaliteevskiy, Saint-Petersburg (RU); Fedor Dmitrievich Kiselev, Saint-Petersburg (RU); Michal Mlejnek, Big Flats, NY (US)

(73) Assignee: CORNING INCORPORATED, Corning, NY (US)

( * ) Notice: Subject to any disclaimer, the term of this patent is extended or adjusted under 35 U.S.C. 154(b) by 175 days.

(21) Appl. No.: 18/011,224

(22) PCT Filed: Jun. 17, 2021

(86) PCT No.: PCT/US2021/037801
§ 371 (c)(1),
(2) Date: Dec. 19, 2022

(87) PCT Pub. No.: WO2021/262519
PCT Pub. Date: Dec. 30, 2021

(65) Prior Publication Data
US 2023/0236846 A1    Jul. 27, 2023

Related U.S. Application Data

(60) Provisional application No. 63/044,615, filed on Jun. 26, 2020.

(51) Int. Cl.
*G06F 9/445* (2018.01)
*G06N 10/40* (2022.01)
(Continued)

(52) U.S. Cl.
CPC ........ *G06F 9/44505* (2013.01); *G06N 10/40* (2022.01); *G02F 1/212* (2021.01); *H04B 10/40* (2013.01); *H04B 10/70* (2013.01)

(58) Field of Classification Search
CPC .... G06F 9/44505; G06N 10/40; G06N 10/00; H04B 10/40; H04B 10/70; G02F 1/212
(Continued)

(56) References Cited

U.S. PATENT DOCUMENTS 6,493,488 B1 * 12/2002 Islam ................... G02B 6/3516
385/47
7,492,903 B2 * 2/2009 Ichimura ............... H04L 9/0855
380/278

(Continued)

OTHER PUBLICATIONS

"An integrated programmable quantum photonic processor for linear optics" Jacob Mower et al., 2014 (Year: 2014).*

*Primary Examiner* — Abbas H Alagheband
(74) *Attorney, Agent, or Firm* — Svetlana Z. Short

(57) ABSTRACT

A quantum computing system that includes a reconfigurable quantum processing unit optically coupled to a photon source and a photon detector and having a plurality of Mach-Zehnder interferometers (MZIs), and a controller communicatively coupled to the plurality of MZIs and configured to generate a control signal to alter a phase setting of at least one of the plurality of MZIs and the plurality of MZIs are configured to alter a phase of one or more photons that traverse the plurality of MZIs. In addition, the quantum computing system includes a quantum memory array having a plurality of quantum memories optically coupled to the plurality of MZIs, where each quantum memory is configured to absorb a photon received by the quantum memory, the received photon including quantum (Continued)

information, and release a photon including the quantum information of the received photon into the reconfigurable quantum processing unit.

25 Claims, 7 Drawing Sheets

(51) Int. Cl.
*G02F 1/21* (2006.01)
*H04B 10/40* (2013.01)
*H04B 10/70* (2013.01)

(58) Field of Classification Search
USPC .......................................................... 398/152
See application file for complete search history.

(56) References Cited

U.S. PATENT DOCUMENTS

| | | | |
|---|---|---|---|
| 10,126,506 B2 * | 11/2018 | Mower | H04L 9/0858 |
| 10,304,536 B2 * | 5/2019 | Brown | C04B 35/505 |
| 10,361,848 B2 * | 7/2019 | Gray | H04L 9/0855 |
| 10,600,482 B2 * | 3/2020 | Kaczmarek | G11C 13/048 |
| 11,218,226 B2 * | 1/2022 | Li | H04B 10/2525 |
| 2017/0163415 A1 * | 6/2017 | Gray | H04L 9/0852 |
| 2018/0274900 A1 * | 9/2018 | Mower | G01B 9/02083 |
| 2018/0322921 A1 * | 11/2018 | Brown | C04B 35/486 |
| 2019/0164607 A1 * | 5/2019 | Kaczmarek | G11C 13/04 |
| 2020/0007242 A1 * | 1/2020 | Li | H04B 10/25133 |
| 2023/0206106 A1 * | 6/2023 | Lindner | G06N 10/40 |
| | | | 716/100 |

\* cited by examiner

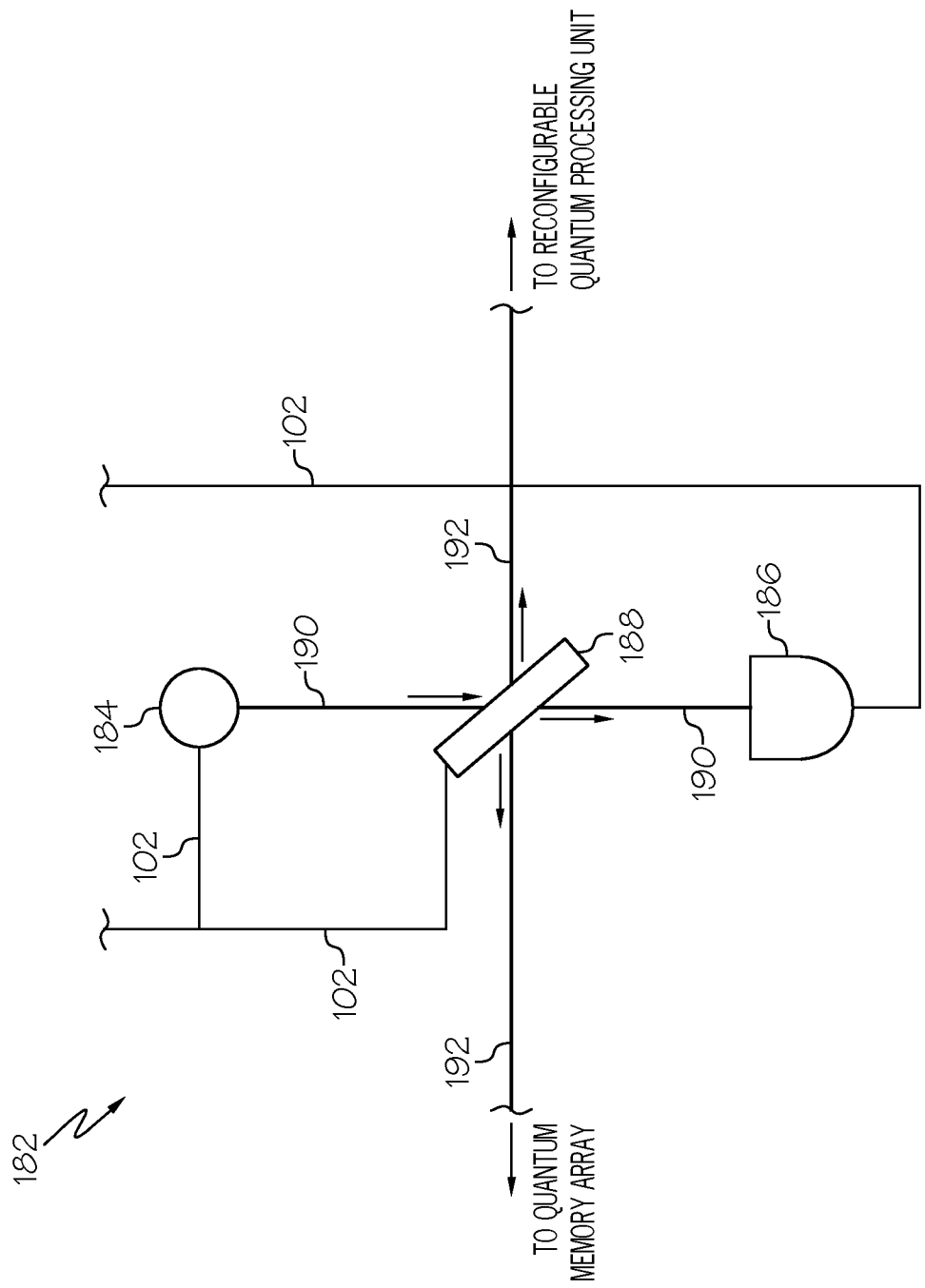

QUANTUM COMPUTING SYSTEMS HAVING A RECONFIGURABLE QUANTUM PROCESSING UNIT

CROSS-REFERENCE TO RELATED APPLICATION

This application claims the benefit of priority under 35 U.S.C. § 371 of International Application No. PCT/US2021/037801, filed on Jun. 17, 2021, which claims priority under 35 U.S.C. § 119(e) from U.S. Provisional Patent Application Ser. No. 63/044,615, filed on Jun. 26, 2020, which is incorporated by reference herein in its entirety.

BACKGROUND

Field

The present specification generally relates to a quantum computing system. More specifically, the present disclosure relates to quantum computing system having a reconfigurable quantum processing unit for performing linear optical quantum computing.

Technical Background

Linear optical quantum computing is a physical implementation of a universal quantum computer that uses quantum gates and qubits. Currently, unitary operations can be performed on dual-rail encoded photons using beamsplitters and phase shifters. The simplicity of the optical elements and the low decoherence make linear optical implementations more attractive than superconductive implementations for quantum computing. However, linear optical quantum computing uses two-qubit and many-qubit linear optical gates, which are probabilistic. Thus, there is a probability that the output of a linear optical quantum computer is incorrect. Accordingly, techniques and designs to reduce the error probability of linear optical quantum computers are desired.

One example linear computing system is described in E. Knill, R. Laflamme, G. Milburn, "Efficient Linear Optics Quantum Computation," arXiv:quant-ph/0006088 (2000), which discusses linear optical quantum computing based on beamsplitters, phase shifters and a teleportation protocol for the creation of near-deterministic many-qubit transformations. However, this protocol requires a large number of linear optical elements to form an optical quantum computer, which creates scalability and qubit synchronization problems. Another example linear computing system is described in J. Carolan et al, "Universal linear optics," Science 349, 6249, p.711-716 (2015), which utilizes reconfigurable Mach-Zehnder interferometers (MZIs) to perform unitary operations. The total number of MZIs needed for a given computational task in such scheme would depend number of qubits and number of computational steps required to complete the task. Thus, increasingly complex computations tasks require a correspondingly increased number of MZIs, which also creates scalability and qubit synchronization problems.

Accordingly, a need exists for an improved, scalable quantum computing systems that are can handle increasingly complex computational tasks.

SUMMARY

According to a first aspect of the present disclosure, a quantum computing system includes a reconfigurable quantum processing unit optically coupled to a photon source and a photon detector, the reconfigurable quantum processing unit having a plurality of Mach-Zehnder interferometers (MZIs), and a controller communicatively coupled to the plurality of MZIs. The controller is configured to generate a control signal to alter a phase setting of at least one of the plurality of MZIs and the plurality of MZIs are configured to alter a phase of one or more photons that traverse the plurality of MZIs. In addition, the quantum computing system includes a quantum memory array having a plurality of quantum memories optically coupled to the plurality of MZIs, where each quantum memory is configured to absorb a photon received by the quantum memory from the reconfigurable quantum processing unit, the received photon including quantum information, and release a photon including the quantum information of the received photon into the reconfigurable quantum processing unit.

A second aspect includes the quantum computing system of the first aspect, where the plurality of MZIs are arranged in an MZI lattice that includes a column of first boundary MZIs disposed along a first end of the reconfigurable quantum processing unit, a column of second boundary MZIs disposed along a second end of reconfigurable quantum processing unit, and one or more columns of interior MZIs positioned between the column of first boundary MZIs and the column of second boundary MZIs.

A third aspect includes the quantum computing system of the second aspect, where the column of first boundary MZIs are optically coupled to an adjacent column of interior MZIs in an offset orientation and the column of second boundary MZIs are optically coupled to an adjacent column of interior MZIs in an offset orientation.

A fourth aspect includes the quantum computing system of the third aspect, where the one or more columns of interior MZIs include a plurality of columns of interior MZIs and adjacent columns of interior MZIs are optically coupled to one another in an offset orientation.

A fifth aspect includes the quantum computing system of any of the second through the fourth aspects, where each first boundary MZI is optically coupled to at least one quantum memory of the quantum memory array such that photons directed from an individual first boundary MZI are received by at least one quantum memory.

A sixth aspect includes the quantum computing system of any of the previous aspects, where each MZI includes an upper link pathway, a lower link pathway, a first beamsplitter and a second beamsplitter optically coupling the upper link pathway and the lower link pathway, a first phase shifter disposed along the upper link pathway or the lower link pathway and a second phase shifter disposed along the upper link pathway or the lower link pathway.

A seventh aspect includes the quantum computing system of the sixth aspect, where the controller is configured to generate a control signal to alter a phase setting of the first phase shifter, the second phase shifter, or both.

An eighth aspect includes the quantum computing system of the sixth aspect or the seventh aspect, where the controller is configured to generate a control signal to alter a coupling ratio of the first beamsplitter, the second beamsplitter, or both.

A ninth aspect includes the quantum computing system of any of the sixth through eighth aspects, where the upper link pathway includes a first upper end link, an upper intermediate link, and a second upper end link, the lower link pathway includes a first lower end link, an lower intermediate link, and a second lower link, the upper and lower first end links are optically coupled to the first beamsplitter, the upper and lower intermediate links extend between and are optically coupled to the first and second beamsplitters, the upper and lower second end links are optically coupled to the second beamsplitter, the first phase shifter is disposed on one of the upper and lower intermediate links, and the second phase shifter is disposed on one of the upper and lower second end links.

A tenth aspect includes the quantum computing system of the ninth aspect, where the upper and lower first end links, the upper and lower second end links, and the upper and lower intermediate links are each optical waveguides.

An eleventh aspect includes the quantum computing system of any of the sixth through tenth aspects, where the first beamsplitter and the second beamsplitter each have a 50:50 coupling ratio.

A twelfth aspect includes the quantum computing system of any of the previous aspects, where the photon source and the photon detector are each part of an optical node, the optical node further including an optical switch positioned between and optically coupled to the photon source and the photon detector.

A thirteenth aspect includes the quantum computing system of the twelfth aspect, where the optical node is disposed between a first end of the reconfigurable quantum processing unit and the quantum memory array, the optical node further including a detection pathway extending between the photon source and the photon detector and traversing the optical switch and a processing pathway extending through the optical switch non-parallel with the detection pathway, where the processing pathway is optically coupled at least one MZI and at least one quantum memory of the quantum memory array.

A fourteenth aspect includes the quantum computing system of the twelfth aspect or the thirteenth aspect, where the optical node is disposed in an optical node array that includes a plurality of optical nodes disposed between and optically coupled to a first end of the reconfigurable quantum processing unit and the quantum memory array.

A fifteenth aspect includes the quantum computing system of any of the previous aspects, where the photon source is a single photon source and the photon detector is a single photon detector.

A sixteenth aspect includes the quantum computing system of any of the previous aspects, where the quantum memory array includes a first quantum memory array, the quantum computing system further includes a second quantum memory array, and the reconfigurable quantum processing unit is positioned between and optically coupled to the first quantum memory array and the second quantum memory array.

A seventeenth aspect includes the quantum computing system of the sixteenth aspect, where each quantum memory of the first quantum memory array and the second quantum memory array are configured to release photons by backward emission such that photons released by both the first quantum memory array and the second quantum memory array are directed toward the reconfigurable quantum processing unit.

An eighteenth aspect includes the quantum computing system of the sixteenth aspect or the seventeenth aspect, where the photon source and the photon detector are each part of an optical node, the optical node further including an optical switch positioned between and optically coupled to the photon source and the photon detector, the optical node is an individual optical node of an optical node array, and the optical node array is disposed between the reconfigurable quantum processing unit and the first quantum memory array such that photons that propagate from the reconfigurable quantum processing unit to the first quantum memory array traverse the optical switch of an individual optical node of the optical node array.

A nineteenth aspect includes the quantum computing system of the eighteenth aspect, where the optical switch of an individual optical node of the optical node array is configured to selectively direct photons toward the first quantum memory array, the reconfigurable quantum processing unit, and an individual photon detector of the individual optical node.

A twentieth aspect includes the quantum computing system of any of the first through the sixteenth aspects, where each quantum memory of the quantum memory array is configured to release photons by forward emission such that photons directed into a first end of the quantum memories from a first end of the reconfigurable quantum processing unit are released from a second end of the quantum memories into bypass optical pathways that are optically coupled to a second end of the reconfigurable quantum processing unit.

According to a twenty-first aspect of the present disclosure, a method of performing a computational task includes directing one or more photons into a reconfigurable quantum processing unit having a plurality of Mach-Zehnder interferometers (MZIs) such that at least one of the one or more photons traverse the reconfigurable quantum processing unit, absorbing, using a quantum memory of a quantum memory array, a photon received by the quantum memory from the reconfigurable quantum processing unit, the received photon including quantum information, where the quantum memory array includes a plurality quantum memories optically coupled to the plurality of MZIs of the reconfigurable quantum processing unit, generating a control signal using a controller communicatively coupled to the plurality of MZIs of the reconfigurable quantum processing unit, the control signal altering a phase setting of at least one of the plurality of MZIs, releasing a photon from the quantum memory into the reconfigurable quantum processing unit such that the released photon traverses the reconfigurable quantum processing unit, where the released photon includes the quantum information of the absorbed photon, and measuring a quantum property of one or more released photons using a photon detector, where the quantum property corresponds with at least a portion of a computational task.

A twenty-second aspect includes the method of the twenty-first aspect, where the quantum property includes at least one of a linear polarization, a circular polarization, an elliptical polarization, a translational momentum, an orbital angular momentum, and a phase.

A twenty-third aspect includes the method of the twenty-first aspect or the twenty-second aspect, where directing the one or more photons into the reconfigurable quantum processing unit includes emitting the one or more photons from one or more photons sources and directing the one or more photons into the reconfigurable quantum processing unit.

A twenty-fourth aspect includes the method of the twenty-first aspect or the twenty-second aspect, where directing the one or more photons into the reconfigurable quantum processing unit includes emitting the one or more photons from one or more photons sources, directing the one or more photons into the quantum memory array such that one or more quantum memories of the quantum memory array absorb the one or more photons, and releasing one or more photons from the one or more quantum memories of the quantum memory array into the reconfigurable quantum processing unit such that the released photons include the quantum information of corresponding absorbed photons.

A twenty-fifth aspect includes the method of the twenty-fourth aspect, where released photons reach the reconfigurable quantum processing unit synchronously.

A twenty-sixth aspect includes the method of any of the twenty-first through the twenty-fifth aspects, where absorbing the photon received by the quantum memory excites an atomic ensemble state of the quantum memory from a first energy state into a second energy state and releasing a photon having the quantum information of the absorbed photon occurs upon return of the atomic ensemble state of the quantum memory to the first energy state.

A twenty-seventh aspect includes the method of the twenty-sixth aspect where return of the atomic ensemble state of the quantum memory to the first energy state occurs in response to a control signal received from the controller.

A twenty-eighth aspect includes the method of any of the twenty-first through the twenty-seventh aspects, where traversing the reconfigurable quantum processing unit with one or more photons performs a computational step of the computational task on the one or more photons.

A twenty-ninth aspect includes the method of any of the twenty-first through the twenty-eighth aspects, where the quantum memory array includes a first quantum memory array, the reconfigurable quantum processing unit is positioned between and optically coupled to the first quantum memory array and a second quantum memory array, the photon detector is part of an optical node, the optical node further including an optical switch positioned between and optically coupled to a photon source and the photon detector, the optical node is an individual optical node of an optical node array, and the optical node array is disposed between the reconfigurable quantum processing unit and the first quantum memory array such that photons that propagate from the reconfigurable quantum processing unit to the first quantum memory array traverse the optical switch of an individual optical node of the optical node array.

A thirtieth aspect includes the method of the twenty-ninth aspect, where each quantum memory of the first quantum memory array and the second quantum memory array are configured to release photons by backward emission such that photons released by both the first quantum memory array and the second quantum memory array are directed toward the reconfigurable quantum processing unit.

A thirty-first aspect includes the method of the twenty-ninth aspect or the thirtieth aspect, where measuring a quantum property of one or more released photons includes directing a photon toward the photon detector using the optical switch, where the optical switch of each individual optical node is configured to selectively direct photons toward the first quantum memory array, the reconfigurable quantum processing unit, and the photon detector of the individual optical node.

According to a thirty-second aspect of the present disclosure, a quantum computing system includes a reconfigurable quantum processing unit having a first end, a second end, and a plurality of Mach-Zehnder interferometers (MZIs) disposed between the first end and the second end, where the reconfigurable quantum processing unit is disposed between a first quantum memory array and a second quantum memory array. The quantum computing system also includes an optical node array having a plurality of optical nodes, where each optical node includes a photon source, a photon detector, and an optical switch positioned between and optically coupled to the photon source and the photon detector, and the optical node array is disposed between the first end of the reconfigurable quantum processing unit and the first quantum memory array such that photons that propagate from the first end of the reconfigurable quantum processing unit to an individual quantum memory of the first quantum memory array traverse the optical switch. In addition, the quantum computing system includes a controller communicatively coupled to the plurality of MZIs, where the controller is configured to generate a control signal to alter a phase setting of at least one of the plurality of MZIs and the plurality of MZIs are configured to alter a phase of one or more photons output by the photon source, and each quantum memory of the first quantum memory array and the second quantum memory array is configured to absorb a photon received from the reconfigurable quantum processing unit, the received photon comprising quantum information, and release a photon comprising the quantum information of the received photon into the reconfigurable quantum processing unit.

A thirty-third aspect includes the quantum computing system of the thirty-second aspect, where the plurality of MZIs are arranged in an MZI lattice that includes a column of first boundary MZIs disposed along a first end of the reconfigurable quantum processing unit, a column of second boundary MZIs disposed along a second end of reconfigurable quantum processing unit, and one or more columns of interior MZIs positioned between the column of first boundary MZIs and the column of second boundary MZIs, where the column of first boundary MZIs are optically coupled to an adjacent column of interior MZIs in an offset orientation and the column of second boundary MZIs are optically coupled to an adjacent column of interior MZIs in an offset orientation.

A thirty-fourth aspect includes the quantum computing system of the thirty-second aspect or the thirty-third aspect, where each MZI includes an upper link pathway, a lower link pathway, a first beamsplitter and a second beamsplitter optically coupling the upper link pathway and the lower link pathway, a first phase shifter disposed along the upper link pathway or the lower link pathway and a second phase shifter disposed along the upper link pathway or the lower link pathway.

A thirty-fifth aspect includes the quantum computing system of the thirty-fourth aspect, where the controller is configured to generate a control signal to alter a phase setting of the first phase shifter, the second phase shifter, or both.

A thirty-sixth aspect includes the quantum computing system of the thirty-fourth aspect or the thirty-fifth aspect, where the controller is configured to generate a control signal to alter a coupling ratio of the first beamsplitter, the second beamsplitter, or both.

A thirty-seventh aspect includes the quantum computing system of any of the thirty-second thorough the thirty-sixth aspects, where the photon source is a single photon source and the photon detector is a single photon detector.

A thirty-eighth aspect includes the quantum computing system of any of the thirty-second thorough the thirty-seventh aspects, where each quantum memory of the first quantum memory array and the second quantum memory array are configured to release photons by backward emission such that photons released by both the first quantum memory array and the second quantum memory array are directed toward the reconfigurable quantum processing unit.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description describe various embodiments and are intended to provide an overview or framework to understanding the nature and character of the claimed subject matter.

The accompanying drawings are included to provide a further understanding of the various embodiments, and are incorporated into and constitute a part of this specification. The drawings illustrate the various embodiments described herein, and together with the description serve to explain the principles and operation of the claimed subject matter.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 4 schematically depicts an example optical node of the optical node array, according to one or more embodiments shown and described herein;

DETAILED DESCRIPTION

Figure 1:
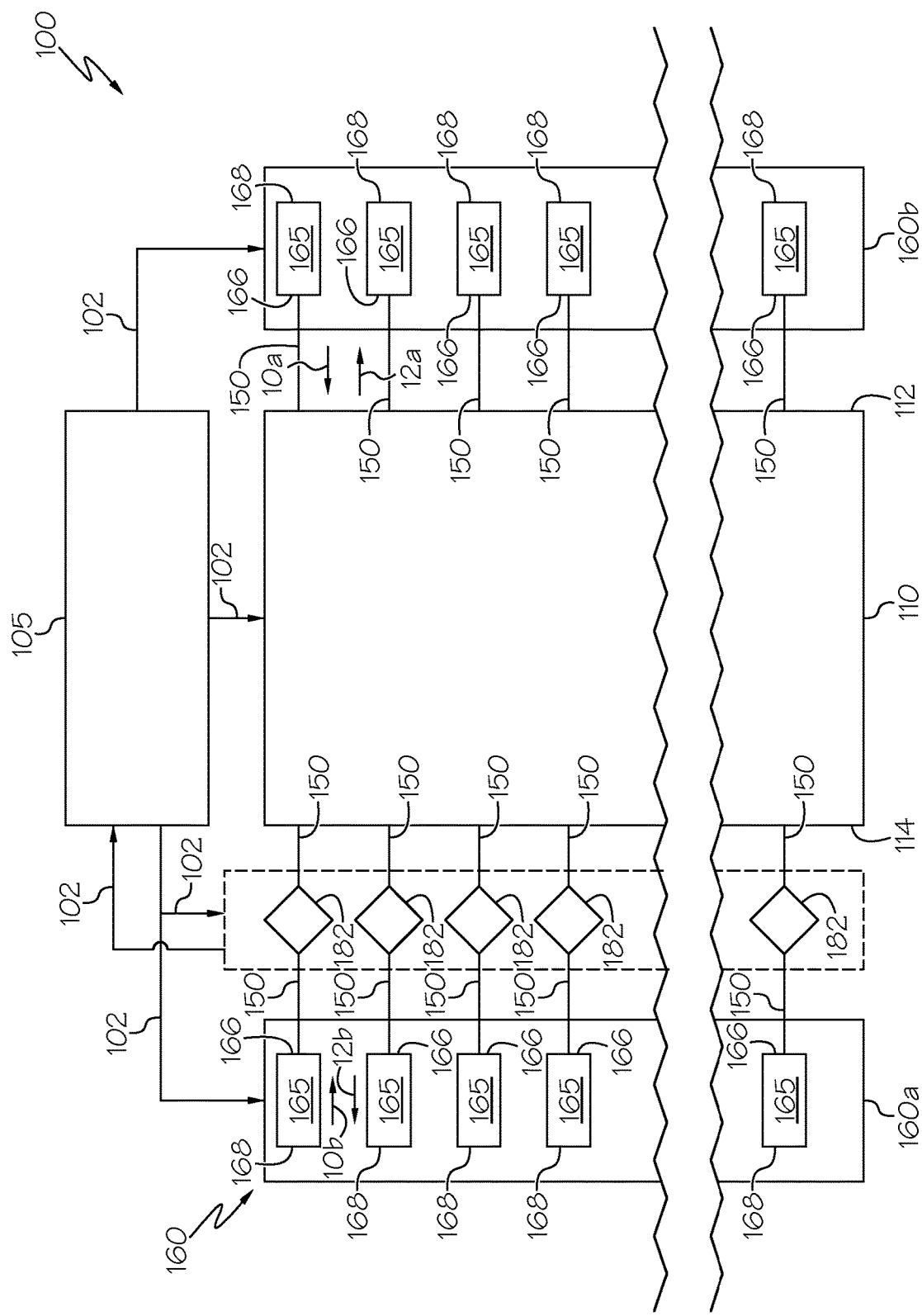
FIG. 1 schematically depicts a quantum computing system comprising a reconfigurable quantum processing unit, an optical node array, and two quantum memory arrays, according to one or more embodiments shown and described herein.

Reference will now be made in detail to embodiments of quantum computing systems that include a reconfigurable quantum processing unit and one or more quantum memory arrays for use in quantum computing processes, examples of which are illustrated in the accompanying drawings. Whenever possible, the same reference numerals will be used throughout the drawings to refer to the same or like parts.

The reconfigurable quantum processing unit can accelerate prototyping and scaling of quantum algorithms by enabling dynamic implementation of any unitary linear optics transformation using a lattice of dynamically tunable Mach-Zehnder interferometers (MZIs). The MZIs are each reconfigurable in response to instructions received by a controller, allowing the reconfigurable quantum processing unit to perform a wide variety of quantum algorithms. Indeed, the reconfigurable quantum processing unit is able to implement large, arbitrary unitary optical transformations to facilitate the development, optimization, and verification of linear optics quantum algorithms. Furthermore, the reconfigurable quantum processing unit is optically coupled to one or more quantum memory arrays. These quantum memory arrays include quantum memories configured to store the quantum information of received photons and release photons having the quantum information of the received photon. This allows modification of each MZI while the quantum information is stored in quantum memories, such that a smaller number of total MZIs can perform larger quantum algorithms by reconfiguring during a computational task. This approach allows the reconfigurable quantum processing unit to compute increasingly large and complex algorithms without requiring an increase in the number of optical components or an increase in the length of the chip on which these optical components are disposed.

Referring now to FIG. 1, a quantum computing system 100 is schematically depicted. The quantum computing system 100 comprises a reconfigurable quantum processing unit 110, an optical node array 180 and one or more quantum memory arrays 160. The optical node array 180 is positioned between and optically coupled to the reconfigurable quantum processing unit 110 and one of the one or more quantum memory arrays 160. The optical node array 180 comprises a plurality of optical nodes 182 that each include a photon source 184 and a photon detector 186 (FIG. 4) and thus operate as the starting point and ending point for each computational task. As used herein, "optically coupled" refers to two or more components arranged such that photons pulses and/or quantum information may be transferred therebetween. For example, connection pathways 150 may optically couple the reconfigurable quantum processing unit 110, the one or more quantum memory arrays 160, and the optical node array 180. The connection pathways 150 may comprise free space, free space in combination with collection optics such as lenses or the like, and/or optical waveguides such as an optical fiber comprising a core and a cladding surrounding the core, a planar waveguide, or the like.

The quantum computing system 100 further comprises a controller 105 communicatively coupled to the reconfigurable quantum processing unit 110, the one or more quantum memory arrays 160, and the optical node array 180, for example, using one or more communication pathways 102. In operation, the controller 105 provides control signals to each. In some embodiments, the quantum computing system 100 may be implemented as an integrated photonic device, such as an "on chip" device. Some or all components of the quantum computing system 100 may be embedded into a planar waveguide or may be a portion of the planar waveguide (e.g., laser written waveguides). In other embodiments, the quantum computing system 100 may comprise bulk optics.

Figure 2:
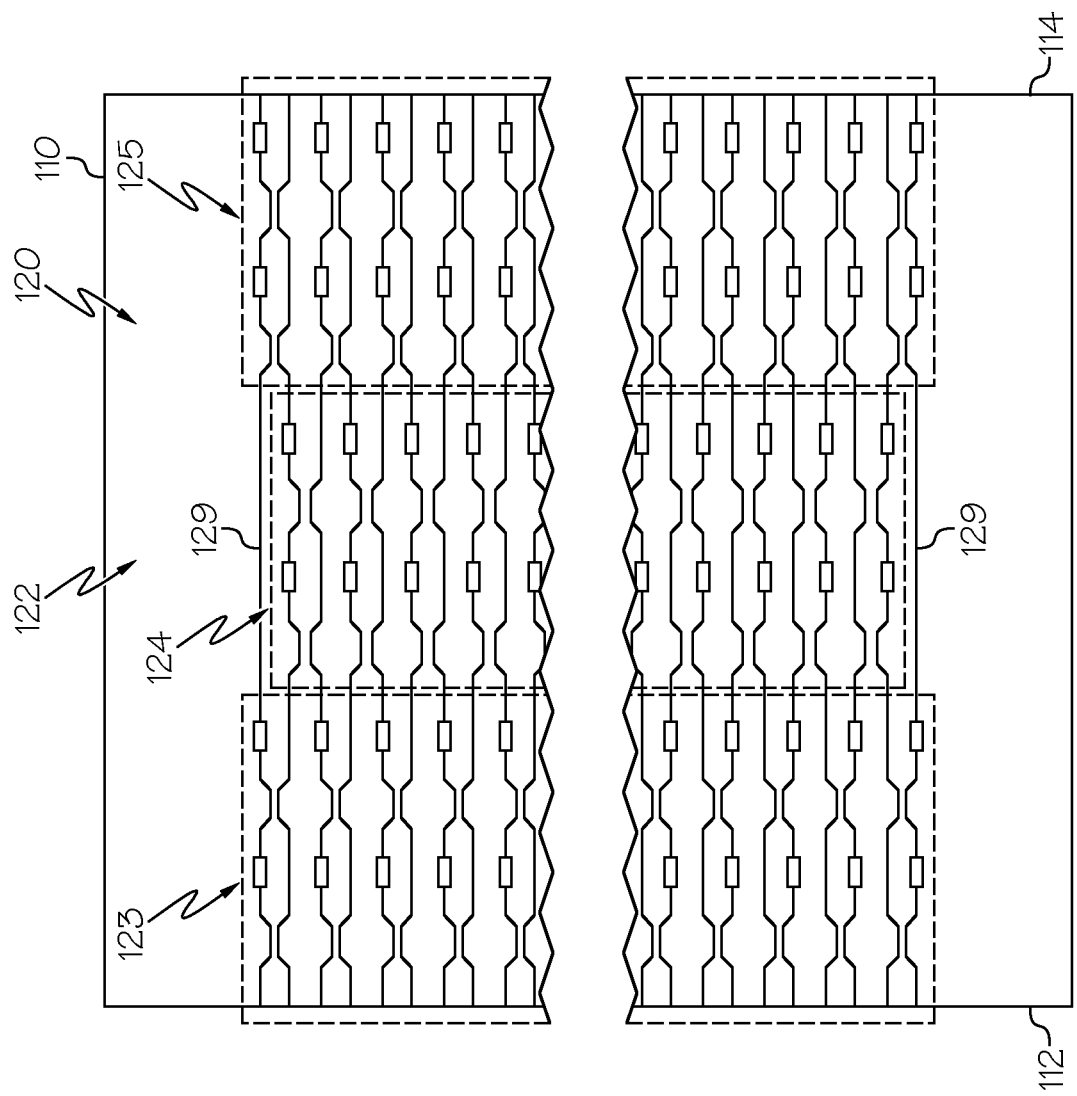
FIG. 2 schematically depicts a reconfigurable quantum processing unit comprising a lattice of MZIs, according to one or more embodiments shown and described herein.

Referring also to FIG. 2, the reconfigurable quantum processing unit 110 is depicted in more detail. The reconfigurable quantum processing unit 110 comprises a first end 112, a second end 114, and a plurality of MZIs 122 arranged in an MZI lattice 120 between the first end 112 and the second end 114. Each MZI 122 comprises a pair of beamsplitters 140*a*, 140*b* and a pair of phase shifters 142*a*, 142*b* (FIG. 3A) and in operation may implement a unitary function on photons traversing the MZI 122. The plurality of MZIs 122 are each communicatively coupled to the controller 105, which provides control signals to the plurality of MZIs 122 to configure the beamsplitters 140*a*, 140*b* and phase shifters 142*a*, 142*b* to implement a particular unitary function. The configuration of the beamsplitters 140*a*, 140*b* and the phase shifters 142*a*, 142*b* of the plurality of MZIs 122 may be altered based on the control signals provided by the controller 105, allowing each MZI 122 to implement a selective, reconfigurable unitary function. The reconfigurability throughout the MZI lattice 120 allows the MZI lattice 120 to implement computational tasks that include selective, reconfigurable functions (i.e., algorithms) of an arbitrarily large size.

Referring still to FIGS. 1 and 2, the one or more quantum memory arrays 160 may comprise a first quantum memory array 160*a* and a second quantum memory array 160*b* arranged such that the reconfigurable quantum processing unit 110 is positioned between the first quantum memory array 160*a* and the second quantum memory array 160*b*. While FIG. 1 depicts two quantum memory arrays 160, it should be understood that embodiments are contemplated with a single quantum memory array 160, such as the embodiment depicted in FIG. 5A. Each quantum memory array 160 comprises a plurality of quantum memories 165 that include a first end 166 opposite a second end 168. The first end 166 of each quantum memory 165 is optically coupled to the reconfigurable quantum processing unit 110 such that photons output by the reconfigurable quantum processing unit 110 are received by the first end 166. For example, the first end 166 of each quantum memory 165 may be optically coupled to the reconfigurable quantum processing unit 110 using the connection pathways 150. In the schematic arrangement shown in FIG. 1, the first end 166 of each quantum memory 165 of the first quantum memory array 160*a* faces a first end 112 the reconfigurable quantum processing unit 110 and the first end 166 of each quantum memory 165 of the second quantum memory array 160*b* faces a second end 114 of the reconfigurable quantum processing unit 110. However, it should be understood that a variety of spatial arrangements are contemplated while retaining optical coupling between the reconfigurable quantum processing unit 110 and the first ends 166 of the quantum memories 165 of the first and second quantum memory arrays 160*a*, 160*b*.

Each quantum memory 165 is structurally configured to store the quantum information of a received photon and release the quantum information of the received photon on another photon. More specifically, while not intending to be limited by theory, each quantum memory 165 is structurally configured to, upon receipt of a photon pulse, absorb a photon via a non-linear optical process thereby exciting an atomic ensemble state of the quantum memory 165 from a first energy state, such as a ground state, into a second energy state, such as a non-ground state, for example, an excited state. As used herein, "atomic ensemble state" refers to the arrangement of energy states of the atoms that comprise the quantum memory 165. As a non-limiting example, in the first energy state, the electrons of the quantum memory 165 may be in a ground state and in the second energy state, some of those electrons may move into an excited state. In some embodiments, the first energy state may have a lower total energy than the second energy state.

While still not intending to be limited by theory, the atomic ensemble state of each quantum memory 165 may return to the first energy state after a period of time, without an outside stimulus, or upon receipt of an outside stimulus, such as a control signal received from the controller 105. While not intending to be limited by theory, the photons released by the quantum memory 165 may comprise the quantum information (e.g., the quantum properties) of the photons received and absorbed by the quantum memory 165, such as coherence properties. As used herein, "quantum information" refers to information about the photon state, such as one or more measurable quantum properties of the photon, for example, polarization, such as linear polarization, circular polarization, elliptical polarization, or any other polarization, translational momentum, orbital angular momentum, phase, or the like. In other words, the photons released by the quantum memory 165 may be in the same quantum state as the photon pulses received by the quantum memory 165.

This allows the controller 105 to reconfigure some or all of the MZIs 122 of the MZI lattice 120 while the quantum information of a photon that has already passed through the reconfigurable quantum processing unit 110 is stored in a quantum memory array 160. Thus, after a first computational step is performed, the MZIs 122 may be reconfigured to perform a second computational step. Then, when the quantum memories 165 release photons having the quantum information of the received photons, these released photons may traverse back through the MZI lattice 120 as if the MZI lattice 120 comprised additional MZIs 122. This process may be repeated to perform additional computational steps. Indeed, the one or more quantum memory arrays 160 allow the quantum computing system 100 to perform increasingly large and complex functions without requiring an increasing number of MZIs 122. For example, in the embodiment depicted in FIG. 1, the first quantum memory array 160*a* and the second quantum memory array 160*b* may be optically coupled to opposite sides of the reconfigurable quantum processing unit 110 (i.e., first and second ends 112, 114) such that photons may propagate between the first and second quantum memory arrays 160*a*, 160*b* traversing the reconfigurable quantum processing unit 110 during each pass. Furthermore, including one or more quantum memory arrays 160 allows for error detection to occur during the computational task, such that the task may be aborted and restarted mid process.

In operation, photons are directed into each quantum memory 165 of the one or more quantum memory arrays 160 in a memory input direction and photons are released from each quantum memory 165 of the one or more quantum memory arrays 160 in a memory output direction. Without intending to be limited by theory, each quantum memory 165 may be configured to release particles by forward emission or backward emission. During backwards emission, the memory input direction of the quantum memory 165 is opposite the memory output direction. For example, during backward emission, the quantum memory 165 receives photons and releases photons at the first end 166. During forward emission, the memory input direction of the quantum memory 165 is the same as the memory output direction. For example, during forward emission, the quantum memory 165 receives photons at the first end 166 and releases photons at the second end 168, which may be opposite the first end 166.

Figure 5A:
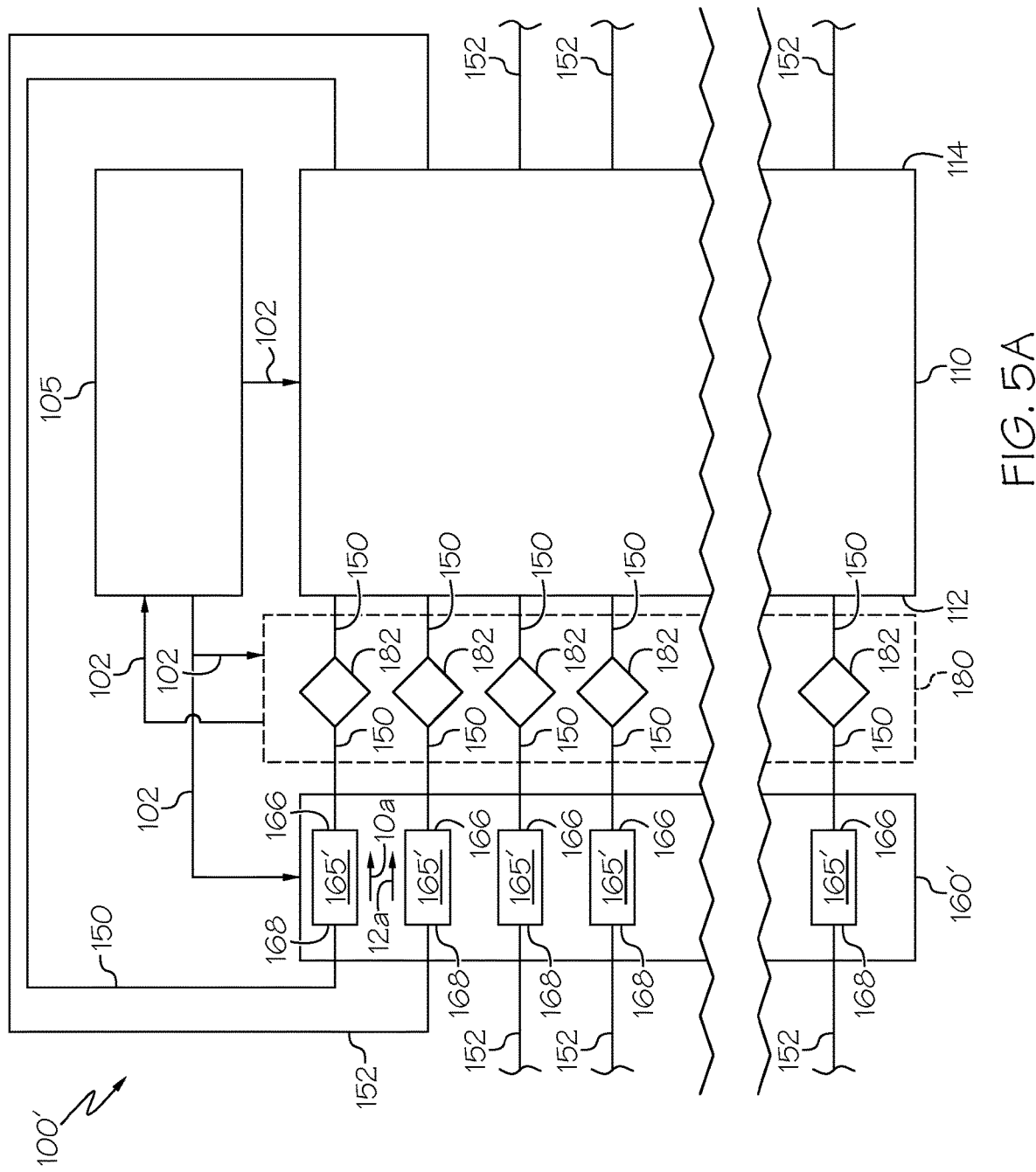
FIG. 5A schematically depicts an example quantum computing system comprising a reconfigurable quantum processing unit, an optical node array, and a single quantum memory array, according to one or more embodiments shown and described herein.
Figure 5B:
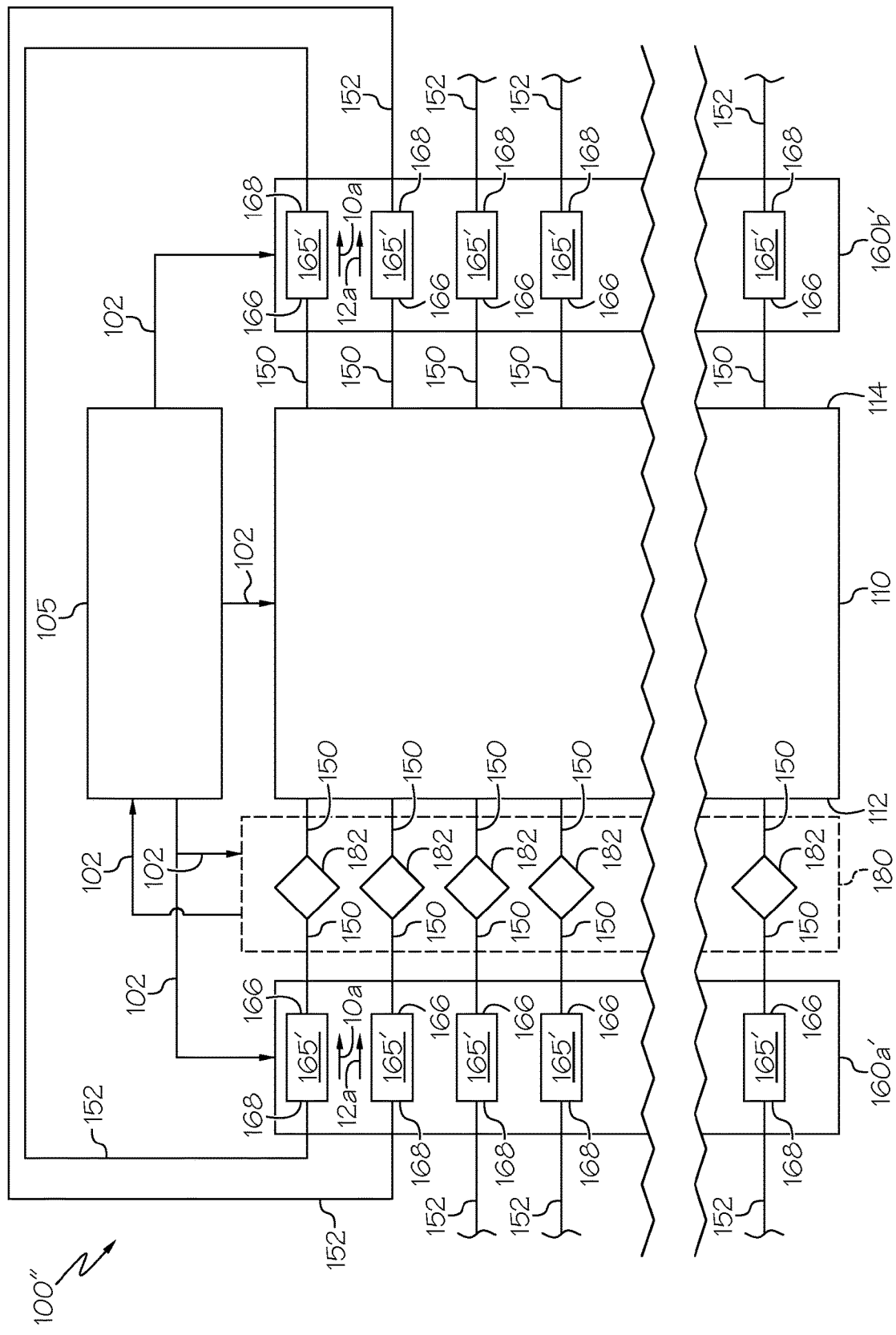
FIG. 5B schematically depicts another example quantum computing system comprising a reconfigurable quantum processing unit, an optical node array, and two quantum memory arrays, according to one or more embodiments shown and described herein.

In the embodiment depicted in FIG. 1, photons are directed into each quantum memory 165 of the first quantum memory array 160*a* in a memory input direction 10*a* and are directed into each quantum memory 165 of the second quantum memory array 160b in a memory input direction 10b. Photons are released from each quantum memory 165 of the first quantum memory array 160a in a memory output direction 12a and are released from each quantum memory 165 of the second quantum memory array 160b in a memory output direction 12b. The quantum memories 165 of the first and second quantum memory arrays 160a, 160b of the quantum computing system 100 of FIG. 1 are configured to release photons by backward emission and thus direct photons back into the reconfigurable quantum processing unit 110 opposite from the direction they were received. In alternative embodiments, such as embodiments depicted in FIGS. 5A and 5B, quantum memories 165' configured to release photons by forward emission are contemplated. In FIGS. 5A and 5B, the quantum memories 165' receive photons at the first end 166 and release photons from the second end 168.

Each quantum memory 165 of the one or more quantum memory arrays 160 may comprise any known or yet to be developed quantum memory, such as a quantum memory based on an atomic frequency comb (AFC) atomic ensemble or a quantum memory based on a controlled reversible inhomogeneous broadening (CRIB) atomic ensemble. Using each of these atomic ensembles, individual photon pulses may be absorbed in such a manner that the quantum information of the received photon pulse is preserved by the atomic ensemble and can be released as a released photon that shares quantum information with a corresponding received photon, for example, some or all of the measurable quantum properties of the corresponding received photon, For example, the released photon may be released upon request (e.g., upon receipt of a control signal of the controller 105) or after a set delay.

Some example quantum memories are described in Sangouard et al., "Quantum Repeaters Based on Atomic Ensembles and Linear Optics"; Review of Modern Physics, vol. 83 Jan.-Mar. 2011; pp. 33-80, in which quantum memories are used in quantum repeaters to enable entanglement swapping. Other example quantum memories include the quantum memory systems described in U.S. Pat. Pub. No. 2018/0322921 titled "Quantum Memory Systems and Quantum Repeater Systems Comprising Doped Polycrystalline Ceramic Optical Devices and Methods of Manufacturing the Same," assigned to Corning Incorporated of Corning, New York. Other example quantum memories may be realized in microwave or radio frequencies (RF), where an electromagnetic field of photons is used as an elemental carrier of information along waveguides (e.g., metallic, superconducting waveguides). An example of this approach is described in Moiseev et al., "Broadband Multiresonator Quantum Memory-Interface," Scientific Reports 8:3982 (2018). Other example quantum memories may realized using microresonators for photons in optical and/or telecommunication wavelength ranges. Furthermore, there example quantum memories may covert optical photons to microwave photons and back. An example of this approach is described in Williamson et al., "Magneto-Optic Modulator with Unit Quantum Efficiency," Phys. Rev. Lett. 113, 203601, Nov. 14, 2014.

Referring still to FIGS. 1 and 2, the MZI lattice 120 of the reconfigurable quantum processing unit 110 includes a column of first boundary MZIs 123 disposed along the first end 112 of the reconfigurable quantum processing unit 110, a column of second boundary MZIs 125 disposed along a second end 114 of reconfigurable quantum processing unit 110, and one or more columns of interior MZIs 124 positioned between the first boundary MZIs 123 and the second boundary MZIs 125. The plurality of first boundary MZIs 123 are optically coupled to the first quantum memory array 160a and the plurality of second boundary MZIs 125 are optically coupled to the second quantum memory array 160b, for example, using connection pathways 150. As depicted in FIG. 2, the column of first boundary MZIs 123 and the column of second boundary MZIs 125 each comprise a single column of MZIs 122. Furthermore, while the column of interior MZIs 124 are depicted as a single column of MZIs 122 in FIG. 2, it should be understood the MZI lattice 120 may comprise multiple columns of interior MZIs 124.

Figure 3A:
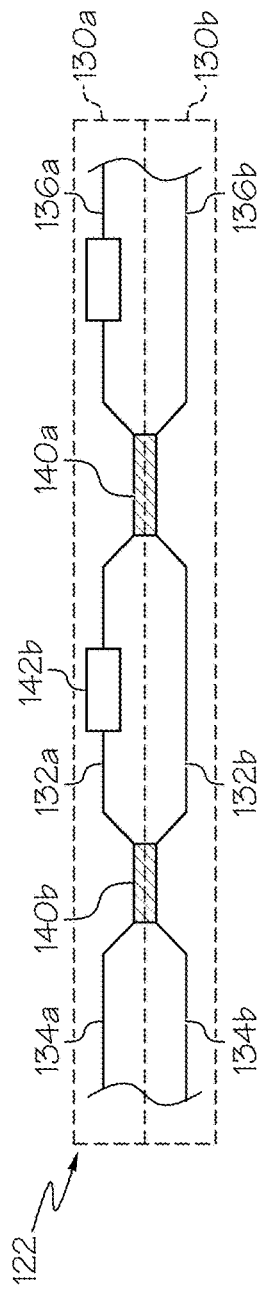
FIG. 3A schematically depicts an example MZI, according to one or more embodiments shown and described herein.

Referring now to FIG. 3A, an individual MZI 122 is schematically depicted. The MZI 122 comprises a first beamsplitter 140a, a second beamsplitter 140b, a first phase shifter 142a, and a second phase shifter 142b. In addition, the MZI 122 comprises a pair of first end links 134a, 134b, a pair of second end links 136a, 136b, and a pair of intermediate links 132a, 132b. In particular, the MZI 122 comprises a upper first end link 134a and a lower first end link 134b each optically coupled to the first beamsplitter 140a, an upper intermediate link 132a and a lower intermediate link 132b each optically coupled to and extending between the first beamsplitter 140a and the second beamsplitter 140b, and a upper second end link 136a and a lower second end link 136b each optically coupled to the second beamsplitter 140b. The first end links 134a, 134b, the second end links 136a, 136b, and the intermediate links 132a, 132b may comprise waveguides, such as optical fibers, planar waveguides, or the like.

Moreover, it should be understood that the terms "upper" and "lower" are used to differentiate the individual links of each pair of links in the MZI 122 are not limited to a specific geometric relationship between the links. The upper first end link 134a, the upper intermediate link 132a or the upper second end link 136a may be generically referred to as upper links and collectively form an upper link pathway 130a. The lower first end link 134b, the lower intermediate link 132b or the lower second end link 136b may be generically referred to as lower links and collectively form a lower link pathway 130b. Furthermore, a link pathway 130 is used herein as a general description of either the upper link pathway 130a or the lower link pathway 130b. For example, each individual optical node 182 is optically coupled to an individual link pathway 130.

In the embodiment depicted in FIG. 3A, the first phase shifter 142a is disposed on the upper intermediate link 132a and the second phase shifter 142b is disposed on the upper second end link 136a. Each phase shifter 142a, 142b is configured to adjust the phase (between 0 and $2\pi$) of photons traversing the phase shifters 142a, 142b. This also alters the relative phase between photons traversing the links with phase shifters (e.g., the upper link pathway 130a) and photons traversing links without phase shifters (e.g., the lower link pathway 130b). The controller 105 is communicatively coupled to each MZI 122, for example, along communication pathways 102 and is configured to change the phase setting of the phase shifters 142a, 142b of each MZI 122 of the MZI lattice 120. For example, the controller 105 can be configured to change the time it takes for photon to travel from the beginning to the end of a physical phase shifter (e.g., 142a, 142b in FIG. 3A) of each MZI 122. Changing the propagation (traveling) time can be accomplished by, for example, changing the refractive index n of the material of the phase shifter 142a, 142b and thereby changing the optical path length L. The net phase change applied by the controller 105 can be anywhere between 0 and 2π. Tuning phase differences allows each MZI 122 to implement any 2×2 unitary function.

The phase shifters 142 may comprise tunable phase shifters such as thermo-optic phase shifters, electro-optic phase shifters, and full optic phase shifters. Example thermo-optic phase shifters are described in Harris et al. "Efficient, compact and low loss thermo-optic phase shifter in silicon," Opt. Express 22(9), 10487-10493 (2014). Example electro-optic phase shifters are described in Macik et al. "Optimization of electro-optic phase shifters for integrated optical phased arrays," Proc. SPIE 10181, Advanced Optics for Defense Applications: UV through LWIR II, 1018105 (11 May 2017). In addition, example full optical phase shifters are described in Wu et al. "An all optical phase shifter and switch near 1550 nm using tungsten disulfide (WS2) deposited tapered fiber" arXiv:1612.04525.

While not depicted, it should be understood that the first phase shifter 142a may alternatively be disposed on the lower intermediate link 132b and the second phase shifter 142b may alternatively be disposed on the lower second end link 136b. Moreover, some embodiments may include additional phase shifters. As one example, a third phase shifter may be disposed on the lower intermediate link 132b or the lower second end link 136b. As another example, a third phase shifter may be disposed on the lower intermediate link 132b and a fourth phase shifter may be disposed on the lower second end link 136b. Including additional phase shifters in the MZI 122 can add additional tunability to the MZI 122.

The first beamsplitter 140a and the second beamsplitter 140b may comprise 50:50beam splitters. 50:50 beamsplitters comprise a 50:50 coupling ratio such that the beamsplitter 140a, 140b directs 50% of photons that enter the beamsplitter 140a, 140b into an upper link and 50% of the photons that enter the beamsplitter 140a, 140b into a lower link. However, it should be understood that first beamsplitter 140a and the second beamsplitter 140b may comprise may comprise other coupling ratios, for example, a range of coupling ratios of from 10:90 to 90:10, such as 20:80, 25:75, 40:60, 45:55, 50:50, 55:45, 60:40, 75:25, 80:20, or the like. Indeed, in some embodiments, the coupling ratios of first beamsplitter 140a and the second beamsplitter 140b may be altered based on control signal received by the MZI 122 from the controller 105, for example, during along one or more communication pathways 102. The first beamsplitter 140a and the second beamsplitter 140b may comprise, for example, directional couplers, multi-mode interferometers, stimulated Raman adiabatic passage (STIRAP) couplers, or other beam splitting means known in the art.

Figure 3B:
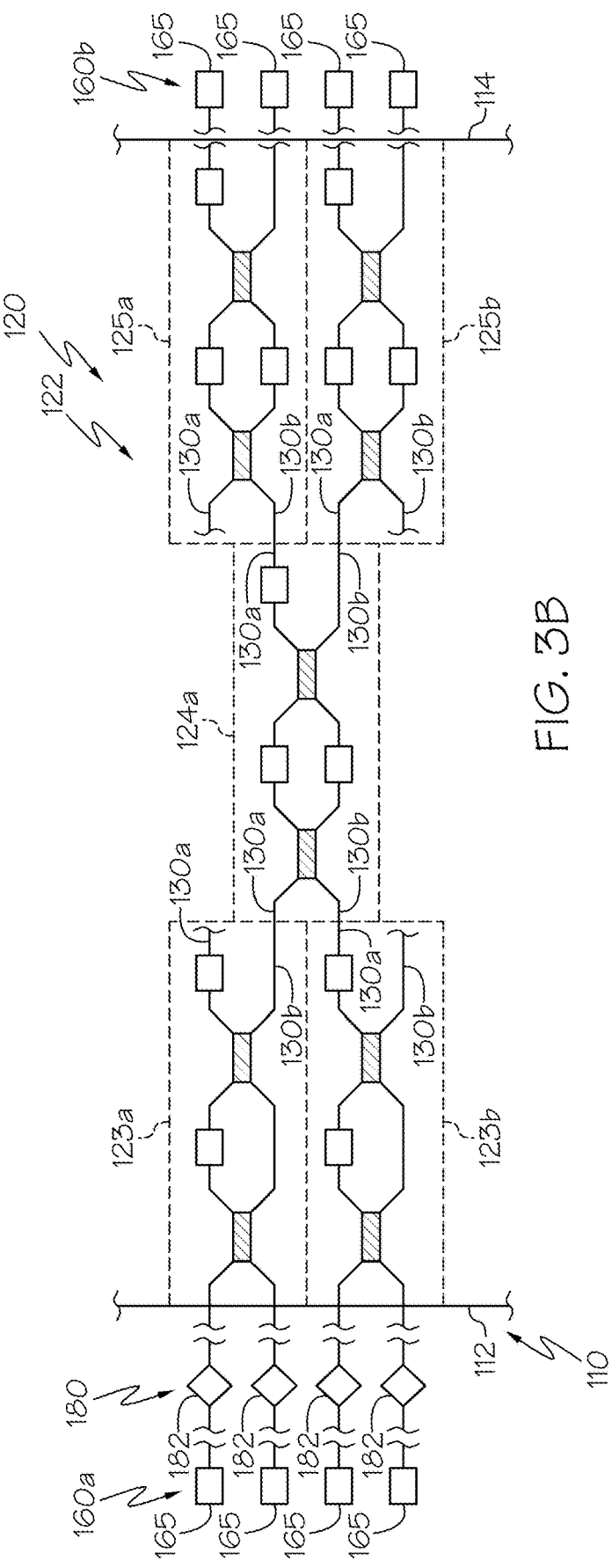
FIG. 3B schematically depicts a portion of the reconfigurable quantum processing unit optically coupled to portions of a first quantum memory array, a second quantum memory array, and an optical node array, according to one or more embodiments shown and described herein.

Referring now to FIGS. 2-3B, the column of first boundary MZIs 123 are optically coupled to an adjacent column of interior MZIs 124 in an offset orientation and the column of second boundary MZIs are optically coupled to an adjacent column of interior MZIs 124 in an offset orientation. Further, in embodiments comprising a plurality of columns of interior MZIs 124, adjacent columns of interior MZIs are optically coupled to one another in an offset orientation. Indeed, in some embodiments, each adjacent column of MZIs 122 are in an offset orientation. As used herein, optical coupled MZIs 122 are in an offset orientation with one another when the upper link pathway 130a of one MZI 122 is connected to the lower link pathway 130b of an adjacent MZI 122. In some embodiments, the MZI lattice 120 may further comprise one or more bypass edge links 129 extending past at least one column of interior MZIs 124 along the top or bottom of the MZI lattice 120. In the embodiment shown in FIG. 2, the bypass edge links 129 extend between the upper link pathways 130a of the topmost first and second boundary MZIs 123, 125 and between the lower link pathways 130b of the bottommost first and second boundary MZIs 123, 125. Indeed, because the reconfigurable quantum processing unit 110 is some finite size, bypass edge links 129 are located at the edges (i.e., the topmost and bottommost edges of the reconfigurable quantum processing unit 110) to provide a finite edge pathway.

FIG. 3B shows the offset orientation in more detail by depicting a portion of each of the column of first boundary MZIs 123, the column of second boundary MZIs 125, and the column of interior MZIs 124. In particular, FIG. 3B depicts two first boundary MZIs 123a, 123b of the column of first boundary MZIs 123, two second boundary MZIs 125a, 125b of the column of second boundary MZIs 125 and a single interior MZI 124a of the column of interior MZIs 124. The upper link pathway 130a of the interior MZI 124a is connected to the lower link pathways 130b of the first boundary MZI 123a and the second boundary MZI 125a at opposite ends of the interior MZI 124a. In addition, the lower link pathway 130b of the interior MZI 124a is connected to the upper link pathways 130a of the first boundary MZI 123b and the second boundary MZI 125b. Without intending to be limited by theory, offsetting each adjacent column of MZIs 122 increases the possible routes for photons propagating from the first end 112 to the second end 114 of the reconfigurable quantum processing unit 110, thereby increasing the complexity of algorithms that may be implemented by the reconfigurable quantum processing unit 110.

Referring now to FIGS. 1-4, the optical node array 180 is positioned between and optically coupled to the reconfigurable quantum processing unit 110 and one of the one or more quantum memory arrays 160. In the embodiment depicted in FIG. 1, the optical node array 180 is positioned between a first end 112 of the reconfigurable quantum processing unit 110 and the first quantum memory array 160a. However, it should be understood that the optical node array 180 may be positioned adjacent and optically coupled to the first end 112 or the second end 114 of the reconfigurable quantum processing unit 110. As shown in FIG. 4, each optical node 182 of the optical node array 180 comprises a photon source 184, a photon detector 186, and an optical switch 188 positioned between and optically coupled to the photon source 184 and the photon detector 186. The photon source 184 may comprise a single photon source, such as a quantum dot, color center, or the like. In addition, the photon detector 186 comprises a single photon detector, such as a superconducting nanowire single photon detector, a carbon nanowire detector, an avalanche photodiode detector, a low dark count photodiode detector, or the like.

The optical node 182 comprises a detection pathway 190 and a processing pathway 192. The detection pathway 190 extends between the photon source 184 and the photon detector 186 and traverses the optical switch 188. The processing pathway 192 also traverses the optical switch 188 non-parallel with the detection pathway 190, for example, orthogonal with the detection pathway 190. The detection pathway 190 and the processing pathway 192 may comprise free space, free space in combination with collection optics such as lenses or the like, and/or optical waveguides such as an optical fiber comprising a core and a cladding surrounding the core, a planar waveguide, or the like. The processing pathway 192 is optically coupled to the reconfigurable quantum processing unit 110 and the first quantum memory array 160a. In some embodiments, the processing pathway 192 may extend from a link pathway 130 of a first boundary MZI 123 to an individual quantum memory 165 and traverses the optical switch 188. In other embodiments, the processing pathway 192 traverses the optical switch 188 and is optically coupled to a link pathway 130 of a first boundary MZI 123 and an individual quantum memory 165 via connection pathways 150. Furthermore, each optical node 182 is communicatively coupled to the controller 105 such that the photon source 184, the photon detector 186, and the optical switch 188 may receive control signals from the controller 105 and provide feedback to the controller 105, for example, along communication pathways 102.

In operation, the photon source 184 generates photons and directs photons from the photon source 184 to the optical switch 188 along the detection pathway 190. At the optical switch 188, the photons may be directed toward the reconfigurable quantum processing unit 110, a quantum memory array 160 (i.e., the first quantum memory array 160a), or the photon detector 186. In operation, the optical switch 188 may selectively direct photons from the photon source 184 to an individual quantum memory 165 of a quantum memory array 160 or an individual MZI 122 of the reconfigurable quantum processing unit 110. The optical switch 188 may also selectively allow photons to pass between an individual quantum memory 165 of a quantum memory array 160 and an individual MZI 122 of the reconfigurable quantum processing unit 110, for example, along the processing pathway 192. Further, the optical switch 188 may selectively direct photons received from an individual quantum memory 165 of a quantum memory array 160 or an individual MZI 122 of the reconfigurable quantum processing unit 110 to the photon detector 186 for detection and measurement. The result of the detection at the photon detector 186 may then be sent to the controller 105.

Referring still to FIGS. 1-4, a method of performing a computational task using the quantum computing system 100 will now be described. At the start of the computational task, the controller 105 sends control signals to the photon sources 184 and optical switches 188 of each optical node 182. The control signals instruct the photon sources 184 to each emit one or more photons and instruct the optical switches 188 to direct the emitted photons from the optical node array 180 into the first quantum memory array 160a or the first end 112 of the reconfigurable quantum processing unit 110. Directing the photons into the first quantum memory array 160a before the first pass through the reconfigurable quantum processing unit 110 allows photons to be released from the first quantum memory array 160a such that photons reach the reconfigurable quantum processing unit 110 synchronously. However, during some operations, the optical switches 188 may first direct some or all emitted photons directly toward the reconfigurable quantum processing unit 110.

Before photons reach the reconfigurable quantum processing unit 110, the controller 105 sends control signals to the reconfigurable quantum processing unit 110 to configure each MZI 122 of the reconfigurable quantum processing unit 110 for a first step of the computational task. For example, the control signals may set (i.e., alter or retain) a phase setting of each phase shifter 142 of the plurality of MZIs 122 and, in some embodiments, the coupling ratio of each beamsplitter 140. In operations in which the photons are first sent to the first quantum memory array 160a, the controller 105 may send control signals to first quantum memory array 160a to time the release of photons such that the reconfigurable quantum processing unit 110 is configured to perform the first computational step on photons when they reach the reconfigurable quantum processing unit 110.

Next, photons propagate through the reconfigurable quantum processing unit 110, where they undergo the first computational step and thereafter reach the second quantum memory array 160b. At the second quantum memory array 160b, the photons are absorbed by the quantum memories 165 to store the output state of each photon (i.e., the quantum information). For example, absorbing the photon received by the quantum memory 165 excites an atomic ensemble state of the quantum memory 165 from a first energy state into a second energy state. Next, the method comprises generating a control signal using the controller 105 to set (i.e., alter or retain) the phase settings of the phase shifters 142 and, in some embodiments, the coupling ratio of the beamsplitters 140 of the plurality of MZIs 122. These phase settings and/or coupling ratios correspond to the second computational step of the computational task. Next, the method comprises releasing photons having the absorbed quantum information from the second quantum memory array 160b into the reconfigurable quantum processing unit 110 such that the released photons traverse the reconfigurable quantum processing unit 110 while the MZIs 122 are set for the second computational step of the computational task.

Releasing the photon occurs upon return of the atomic ensemble state of the quantum memory to the first energy state, for example, in response to a control signal from the controller 105. Each released photon comprises the quantum information of a corresponding absorbed photon and the released photons traverse the reconfigurable quantum processing unit 110 to undergo the second computational step of the computational task. Furthermore, the release of photons from the second quantum memory array 160b may be controlled to facilitate synchronous arrival of the photons to the reconfigurable quantum processing unit for the second computational step. Indeed, each computational step may be synchronized by the controller 105 sending control signals to release of photons from the first and second quantum memory arrays 160a, 160b.

After traversing the reconfigurable quantum processing unit 110, photons having undergone the second computational step may be absorbed by the first quantum memory array 160a. Control signals are then sent by the controller 105 to set (i.e., alter or retain) the phase settings of the phase shifters 142 and, in some embodiments, the coupling ratio of the beamsplitters 140 of the plurality of MZIs 122. These phase settings and/or coupling ratios correspond to the third computational step of the computational task. Next, photons having the absorbed quantum information are released from the first quantum memory array 160a, passing through the reconfigurable quantum processing unit 110 to undergo the third computational step. Additional passes through the reconfigurable quantum processing unit 110 that include absorbing quantum information in a quantum memory array 160, setting phase settings and/or coupling ratios of the MZIs 122 of the reconfigurable quantum processing unit 110, and directing photons through the reconfigurable quantum processing unit 110 may be repeated to perform additional computational steps.

Next, the method comprises measuring a quantum property of one or more released photons using the photon detector, where the quantum property corresponds with at least a portion of the computational task. In particular, the controller 105 may send control signals to one or more optical switches 188, such that these optical switches 188 direct photons to the photon detector 186. In some embodiments, the controller 105 may also send control signals to the photon sources 184 of the optical nodes 182 where a detection event occurred, instruction those photon sources 184 to emit one or more additional photons, as needed, to perform the computational task. Indeed, in some embodiments, a portion of the reconfigurable quantum processing unit 110 may be programmed by the controller 105 to run intermediate measurements (i.e., mid-computational tasks) to determine whether an error has occurred. These intermediate tasks allow the controller 105 to determine if an error has occurred during the computational task, as opposed to after the computational task. If an error is detected, the controller 105 may instruct the reconfigurable quantum processing unit 110 to cease operation and restart the computational task. This allows errors to be corrected faster than in embodiments that determine error upon completion of the computational task.

Without intending to be limited by theory, to perform intermediate measurements, the controller 105 sets some of the optical nodes 182 and corresponding (i.e., optically coupled) MZIs 122 to operate as auxiliary channels. For example, a subset of optically coupled MZIs 122 extending from the first end 112 to the second end 114 of the reconfigurable quantum processing unit 110 may be programmed to perform intermediate computational tasks on the photons such that intermediate measurements may be performed at the associated optical nodes 182. In addition, this subset of MZIs 122 may be programmed to sequester the photons emitted by the one or more optical nodes 182 configured to run intermediate measurements apart from photons traversing the reconfigurable quantum processing unit 110 that are performing the computational task (i.e., operating as qubits) such that these intermediate photons do not disrupt the computational task. Without intending to be limited by theory, when performing computational tasks using the reconfigurable quantum processing unit 110, the photons (i.e., the photons operating as qubits) traversing the reconfigurable quantum processing unit 110 form a collective superposition, such that there is only a probability that the photons traversing the reconfigurable quantum processing unit 110 may correctly implement the computational task. Thus, by performing an intermediate measurement to determine if the collective superposition has led to an error during the computational task, the computational task may be ceased and restarted mid-computation, reducing total computational time and increasing the speed and efficiency of the quantum computing system 100.

In some embodiments, as shown in FIG. 1, photons are directed back and forth between the first quantum memory array 160a and the second quantum memory array 160b traversing the reconfigurable quantum processing unit 110 during each pass. Indeed, in the embodiment depicted in FIG. 1, the quantum memories 165 each release photons by backwards emission, in which the memory output direction 12a of the first quantum memory array 160a is opposite the memory input direction 10a of the first quantum memory array 160a and the memory output direction 12b of the second quantum memory array 160b is opposite the memory input direction 10b of the second quantum memory array 160b. Because the first and second quantum memory arrays 160a, 160b in the embodiment of the quantum computing system 100 operate by backwards emission, photons may traverse back and forth through the MZI lattice 120 multiple times. Thus, each pass through the MZI lattice 120 performs a single computational step of a quantum algorithm.

In other embodiments, computational tasks may performed using quantum memories 165 that operate by forward emission. Referring now to FIGS. 5A and 5B, embodiments of the quantum computing system 100' and 100" are depicted in which the quantum memories 165 operate by forward emission. For example, the quantum computing system 100' of FIG. 5A includes a single quantum memory array 160' comprising quantum memories 165' configured to release photons by forward emission. In particular, in the embodiment depicted in FIG. 5A, the memory input direction 10a and the memory output direction 12a of the quantum memories 165' are the same. Thus, instead of directing released photons back along the same pathway that photons are received (e.g., along connection pathways 150); the photons are released into a bypass optical pathway 152, which is optically coupled to the reconfigurable quantum processing unit 110. In the embodiment depicted FIG. 5A, the quantum memory array 160' is optically coupled to the first end 112 of the reconfigurable quantum processing unit 110 via the optical node array 180 and optically coupled to the second end 114 of the reconfigurable quantum processing unit 110 via the bypass optical pathways 152. Indeed, the bypass optical pathways 152 extend from the quantum memories 165' to second end 114 of the reconfigurable quantum processing unit 110. Thus, in operation, photons released from the quantum memory array 160' traverse the reconfigurable quantum processing unit 110 from the second end 114 to the first end 112. Each pass allows the reconfigurable quantum processing unit 110 to perform a computational step of a computational task.

Referring now to FIG. 5B, the quantum computing system 100" includes quantum memories 165 that operate by forward emission and are arranged in a first quantum memory array 160a' and a second quantum memory array 160b'. The first quantum memory array 160a' of the quantum computing system 100" operates similar to the single quantum memory array 160' of FIG. 5A in that the quantum memories 165' of the first quantum memory array 160a' received photons at a first end 166 in a memory input direction 10a and release received photons from a second end 168 into a bypass optical pathway 152 in a memory output direction 12a, which is the same as the memory input direction 10a. However, unlike the quantum computing system 100' of FIG. 5A, quantum computing system 100" includes a second quantum memory array 160b' positioned proximate the second end 114 of the reconfigurable quantum processing unit 110. Like the first quantum memory array 160a', the second quantum memory array 160b' includes a plurality of quantum memories 165' configured to operate by forward emission. The second quantum memory array 160b' may be used to facilitate synchronous arrival of photons to the reconfigurable quantum processing unit 110. For example, the second quantum memory array 160b' may correct any temporal misalignment generated as photons traverse the bypass optical pathways 152.

Figure 6:
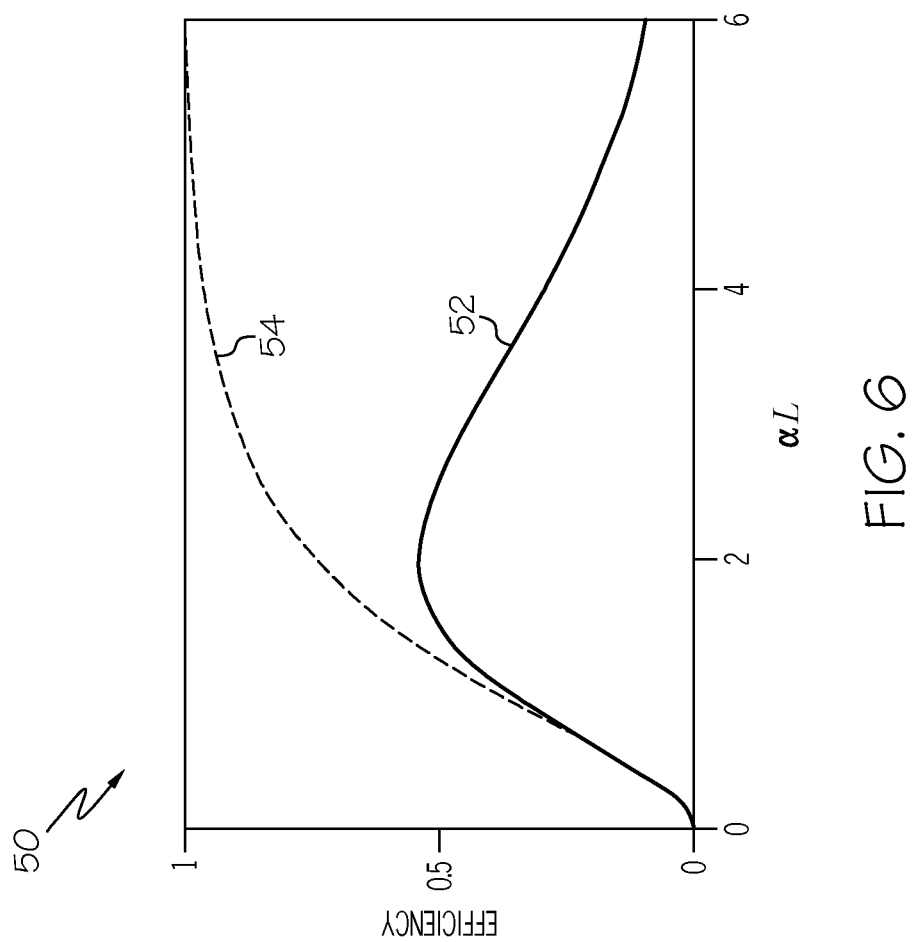
FIG. 6 graphically depicts quantum memory efficiency as a function of optical depth for a quantum memory when releasing stored quantum information using forward propagation and when releasing stored quantum information using backward propagation, according to one or more embodiments shown and described herein.

Referring now to FIG. 6, a graph 50 depicts quantum memory efficiency as a function of optical depth $\alpha L$ (e.g., absorption efficiency) for an example quantum memory that releases photons by forward emission, such as quantum memories 165', (line 52) and by backward emission, such as quantum memories 165 (line 54). Without intending to be limited by theory, during forward emission, released photons may be partially reabsorbed by the material of the quantum memory, which can cause measurement errors in the quantum computing system 100, 100', 100". However, this partial reabsorption can be reduced and/or eliminated by backward emission because backward emission suppresses the reabsorption of the released photon. Indeed, as shown in FIG. 6, backward emission can occur with an efficiency of up to 100% (line 54) while forward emission can occur at an efficiency of no greater than 54% (line 52). Thus, the quantum computing system 100 comprising quantum memories 165 may operate with increased efficiencies and reduced errors. However, in some embodiments, it may be advantageous to use forward emission, for example, when a single quantum memory array is desired, for example, to reduce the cost and the size of the quantum computing system, as shown in FIG. 5A.

In view of the foregoing description, it should be understood that quantum computing systems may include a reconfigurable quantum processing unit and one or more quantum memory arrays for use in quantum computing processes. The reconfigurable quantum processing unit includes a lattice of dynamically tunable MZIs that are each reconfigurable in response to instructions received by a controller, allowing the reconfigurable quantum processing unit to perform a wide variety of quantum algorithms. In addition, the quantum memory arrays include quantum memories that allow for modification of each MZI while the quantum information is stored in quantum memories and facilitate synchronization of photon propagation through the reconfigurable quantum processing unit. Thus allows a smaller number of total MZIs to handle larger quantum algorithms by reconfiguring during the computational task. Thus, the quantum computing systems described herein provide scalable systems for computing increasingly large and complex algorithms.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A quantum computing system comprising:
   a reconfigurable quantum processing unit optically coupled to a photon source and a photon detector, the reconfigurable quantum processing unit comprising a plurality of Mach-Zehnder interferometers (MZIs);
   a controller communicatively coupled to the plurality of MZIs, wherein the controller is configured to generate a control signal to alter a phase setting of at least one of the plurality of MZIs and the plurality of MZIs are configured to alter a phase of one or more photons that traverse the plurality of MZIs; and
   a quantum memory array comprising a plurality of quantum memories optically coupled to the plurality of MZIs, wherein each quantum memory is configured to absorb a photon received by the quantum memory from the reconfigurable quantum processing unit, the received photon comprising quantum information, and release a photon comprising the quantum information of the received photon into the reconfigurable quantum processing unit,
   wherein the plurality of MZIs are arranged in an MZI lattice comprising:
   a column of first boundary MZIs disposed along a first end of the reconfigurable quantum processing unit;
   a column of second boundary MZIs disposed along a second end of reconfigurable quantum processing unit; and
   one or more columns of interior MZIs positioned between the column of first boundary MZIs and the column of second boundary MZIs, and, wherein:
   (i) the column of first boundary MZIs are optically coupled to an adjacent column of interior MZIs in an offset orientation and the column of second boundary MZIs are optically coupled to an adjacent column of interior MZIs in an offset orientation; or
   (ii) wherein each first boundary MZI is optically coupled to at least one quantum memory of the quantum memory array such that photons directed from an individual first boundary MZI are received by at least one quantum memory.

2. The quantum computing system of claim 1, wherein the one or more columns of interior MZIs comprise a plurality of columns of interior MZIs and adjacent columns of interior MZIs are optically coupled to one another in an offset orientation.

3. The quantum computing system of claim 1, wherein the photon source comprises a single photon source and the photon detector comprises a single photon detector.

4. A quantum computing system comprising:
   a reconfigurable quantum processing unit optically coupled to a photon source and a photon detector, the reconfigurable quantum processing unit comprising a plurality of Mach-Zehnder interferometers (MZIs);
a controller communicatively coupled to the plurality of MZIs, wherein the controller is configured to generate a control signal to alter a phase setting of at least one of the plurality of MZIs and the plurality of MZIs are configured to alter a phase of one or more photons that traverse the plurality of MZIs; and
a quantum memory array comprising a plurality of quantum memories optically coupled to the plurality of MZIs, wherein each quantum memory is configured to absorb a photon received by the quantum memory from the reconfigurable quantum processing unit, the received photon comprising quantum information, and release a photon comprising the quantum information of the received photon into the reconfigurable quantum processing unit, wherein each MZI comprises an upper link pathway, a lower link pathway, a first beamsplitter and a second beamsplitter optically coupling the upper link pathway and the lower link pathway, a first phase shifter disposed along the upper link pathway or the lower link pathway and a second phase shifter disposed along the upper link pathway or the lower link pathway; and
  (i) wherein the controller is configured to generate a control signal to alter a phase setting of the first phase shifter, the second phase shifter, or both; or
  (ii) wherein the controller is configured to generate a control signal to alter a coupling ratio of the first beamsplitter, the second beamsplitter, or both; or
  (iii) wherein the first beamsplitter and the second beamsplitter each comprise a 50:50 coupling ratio.

5. The quantum computing system of claim 4 wherein the photon source comprises a single photon source and the photon detector comprises a single photon detector.

6. The quantum computing system of claim 4, wherein the photon source and the photon detector are each part of an optical node, the optical node further comprising an optical switch positioned between and optically coupled to the photon source and the photon detector.

7. A quantum computing system comprising:
a reconfigurable quantum processing unit optically coupled to a photon source and a photon detector, the reconfigurable quantum processing unit comprising a plurality of Mach-Zehnder interferometers (MZIs);
a controller communicatively coupled to the plurality of MZIs, wherein the controller is configured to generate a control signal to alter a phase setting of at least one of the plurality of MZIs and the plurality of MZIs are configured to alter a phase of one or more photons that traverse the plurality of MZIs; and
a quantum memory array comprising a plurality of quantum memories optically coupled to the plurality of MZIs, wherein each quantum memory is configured to absorb a photon received by the quantum memory from the reconfigurable quantum processing unit, the received photon comprising quantum information, and release a photon comprising the quantum information of the received photon into the reconfigurable quantum processing unit, wherein each MZI comprises an upper link pathway, a lower link pathway, a first beamsplitter and a second beamsplitter optically coupling the upper link pathway and the lower link pathway, a first phase shifter disposed along the upper link pathway or the lower link pathway and a second phase shifter disposed along the upper link pathway or the lower link pathway; and, wherein:
the upper link pathway includes a first upper end link, an upper intermediate link, and a second upper end link;
the lower link pathway includes a first lower end link, an lower intermediate link, and a second lower link;
the upper and lower first end links are optically coupled to the first beamsplitter;
the upper and lower intermediate links extend between and are optically coupled to the first and second beamsplitters;
the upper and lower second end links are optically coupled to the second beamsplitter;
the first phase shifter is disposed on one of the upper and lower intermediate links; and
the second phase shifter is disposed on one of the upper and lower second end links.

8. The quantum computing system of claim 7, wherein the upper and lower first end links, the upper and lower second end links, and the upper and lower intermediate links each comprise optical waveguides.

9. The quantum computing system of claim 7 wherein the first beamsplitter and the second beamsplitter each comprise a 50:50 coupling ratio.

10. A quantum computing system comprising:
a reconfigurable quantum processing unit optically coupled to a photon source and a photon detector, the reconfigurable quantum processing unit comprising a plurality of Mach-Zehnder interferometers (MZIs);
a controller communicatively coupled to the plurality of MZIs, wherein the controller is configured to generate a control signal to alter a phase setting of at least one of the plurality of MZIs and the plurality of MZIs are configured to alter a phase of one or more photons that traverse the plurality of MZIs; and
a quantum memory array comprising a plurality of quantum memories optically coupled to the plurality of MZIs, wherein each quantum memory is configured to absorb a photon received by the quantum memory from the reconfigurable quantum processing unit, the received photon comprising quantum information, and release a photon comprising the quantum information of the received photon into the reconfigurable quantum processing unit,
  wherein the photon source and the photon detector are each part of an optical node, the optical node further comprising an optical switch positioned between and optically coupled to the photon source and the photon detector, wherein: (i) the optical node is disposed between a first end of the reconfigurable quantum processing unit and the quantum memory array, the optical node further comprising:
  a detection pathway extending between the photon source and the photon detector and traversing the optical switch; and
  a processing pathway extending through the optical switch non-parallel with the detection pathway, wherein the processing pathway is optically coupled at least one MZI and at least one quantum memory of the quantum memory array; or
  (ii) the optical node is disposed in an optical node array comprising a plurality of optical nodes disposed between and optically coupled to a first end of the reconfigurable quantum processing unit and the quantum memory array.

11. The quantum computing system of claim 10, wherein the photon source comprises a single photon source and the photon detector comprises a single photon detector.

12. A quantum computing system comprising:
a reconfigurable quantum processing unit optically coupled to a photon source and a photon detector, the reconfigurable quantum processing unit comprising a plurality of Mach-Zehnder interferometers (MZIs);

a controller communicatively coupled to the plurality of MZIs, wherein the controller is configured to generate a control signal to alter a phase setting of at least one of the plurality of MZIs and the plurality of MZIs are configured to alter a phase of one or more photons that traverse the plurality of MZIs; and a quantum memory array comprising a plurality of quantum memories optically coupled to the plurality of MZIs, wherein each quantum memory is configured to absorb a photon received by the quantum memory from the reconfigurable quantum processing unit, the received photon comprising quantum information, and release a photon comprising the quantum information of the received photon into the reconfigurable quantum processing unit wherein:

(i) the quantum memory array comprises a first quantum memory array;

the quantum computing system further comprises a second quantum memory array; and the reconfigurable quantum processing unit is positioned between and optically coupled to the first quantum memory array and the second quantum memory array; or (ii) each quantum memory of the first quantum memory array and the second quantum memory array are configured to release photons by backward emission such that photons released by both the first quantum memory array and the second quantum memory array are directed toward the reconfigurable quantum processing unit; or (iii) the photon source and the photon detector are each part of an optical node, the optical node further comprising an optical switch positioned between and optically coupled to the photon source and the photon detector;

the optical node is an individual optical node of an optical node array; and the optical node array is disposed between the reconfigurable quantum processing unit and the first quantum memory array such that photons that propagate from the reconfigurable quantum processing unit to the first quantum memory array traverse the optical switch of an individual optical node of the optical node array.

13. The quantum computing system of claim 12, wherein the photon source and the photon detector are each part of an optical node, the optical node further comprising an optical switch positioned between and optically coupled to the photon source and the photon detector;

the optical node is an individual optical node of an optical node array; and the optical node array is disposed between the reconfigurable quantum processing unit and the first quantum memory array such that photons that propagate from the reconfigurable quantum processing unit to the first quantum memory array traverse the optical switch of an individual optical node of the optical node array, wherein the optical switch of an individual optical node of the optical node array is configured to selectively direct photons toward the first quantum memory array, the reconfigurable quantum processing unit, and an individual photon detector of the individual optical node.

14. A quantum computing system comprising:

a reconfigurable quantum processing unit optically coupled to a photon source and a photon detector, the reconfigurable quantum processing unit comprising a plurality of Mach-Zehnder interferometers (MZIs);

a controller communicatively coupled to the plurality of MZIs, wherein the controller is configured to generate a control signal to alter a phase setting of at least one of the plurality of MZIs and the plurality of MZIs are configured to alter a phase of one or more photons that traverse the plurality of MZIs; and a quantum memory array comprising a plurality of quantum memories optically coupled to the plurality of MZIs, wherein each quantum memory is configured to absorb a photon received by the quantum memory from the reconfigurable quantum processing unit, the received photon comprising quantum information, and release a photon comprising the quantum information of the received photon into the reconfigurable quantum processing unit, wherein each quantum memory of the quantum memory array is configured to release photons by forward emission such that photons directed into a first end of the quantum memories from a first end of the reconfigurable quantum processing unit are released from a second end of the quantum memories into bypass optical pathways that are optically coupled to a second end of the reconfigurable quantum processing unit.

15. A method of performing a computational task, the method comprising:

directing one or more photons into a reconfigurable quantum processing unit comprising a plurality of Mach-Zehnder interferometers (MZIs) such that at least one of the one or more photons traverse the reconfigurable quantum processing unit;

absorbing, using a quantum memory of a quantum memory array, a photon received by the quantum memory from the reconfigurable quantum processing unit, the received photon comprising quantum information, wherein the quantum memory array comprises a plurality quantum memories optically coupled to the plurality of MZIs of the reconfigurable quantum processing unit;

generating a control signal using a controller communicatively coupled to the plurality of MZIs of the reconfigurable quantum processing unit, the control signal altering a phase setting of at least one of the plurality of MZIs;

releasing a photon from the quantum memory into the reconfigurable quantum processing unit such that the released photon traverses the reconfigurable quantum processing unit, wherein the released photon comprises the quantum information of the absorbed photon; and measuring a quantum property of one or more released photons using a photon detector, wherein the quantum property corresponds with at least a portion of a computational task, (i) wherein the controller is configured to generate a control signal to alter a phase setting of the at least one phaseshifter, or (ii) wherein the controller is configured to generate a control signal to alter a coupling ratio of tat least one beamsplitter, or (iii) releasing one or more photons from the one or more quantum memories of the quantum memory array into the reconfigurable quantum processing unit such that the released photons comprise the quantum information of corresponding absorbed photons.

16. The method of claim 15, wherein the quantum property comprises at least one of a linear polarization, a circular polarization, an elliptical polarization, a translational momentum, an orbital angular momentum, and a phase.

17. The method of claim 15, wherein directing the one or more photons into the reconfigurable quantum processing unit comprises emitting the one or more photons from one or more photons sources and directing the one or more photons into the reconfigurable quantum processing unit.

18. A method of performing a computational task, the method comprising:
  directing one or more photons into a reconfigurable quantum processing unit comprising a plurality of Mach-Zehnder interferometers (MZIs) such that at least one of the one or more photons traverse the reconfigurable quantum processing unit;
  absorbing, using a quantum memory of a quantum memory array, a photon received by the quantum memory from the reconfigurable quantum processing unit, the received photon comprising quantum information, wherein the quantum memory array comprises a plurality quantum memories optically coupled to the plurality of MZIs of the reconfigurable quantum processing unit;
  generating a control signal using a controller communicatively coupled to the plurality of MZIs of the reconfigurable quantum processing unit, the control signal altering a phase setting of at least one of the plurality of MZIs;
  releasing a photon from the quantum memory into the reconfigurable quantum processing unit such that the released photon traverses the reconfigurable quantum processing unit, wherein the released photon comprises the quantum information of the absorbed photon; and
  measuring a quantum property of one or more released photons using a photon detector, wherein the quantum property corresponds with at least a portion of a computational task, wherein directing the one or more photons into the reconfigurable quantum processing unit comprises:
    emitting the one or more photons from one or more photons sources;
    directing the one or more photons into the quantum memory array such that one or more quantum memories of the quantum memory array absorb the one or more photons; and
    releasing one or more photons from the one or more quantum memories of the quantum memory array into the reconfigurable quantum processing unit such that the released photons comprise the quantum information of corresponding absorbed photons.

19. The method of claim 18, wherein released photons reach the reconfigurable quantum processing unit synchronously.

20. The method of claim 18, wherein traversing the reconfigurable quantum processing unit with one or more photons performs a computational step of the computational task on the one or more photons.

21. A method of performing a computational task, the method comprising:
  directing one or more photons into a reconfigurable quantum processing unit comprising a plurality of Mach-Zehnder interferometers (MZIs) such that at least one of the one or more photons traverse the reconfigurable quantum processing unit;
  absorbing, using a quantum memory of a quantum memory array, a photon received by the quantum memory from the reconfigurable quantum processing unit, the received photon comprising quantum information, wherein the quantum memory array comprises a plurality quantum memories optically coupled to the plurality of MZIs of the reconfigurable quantum processing unit;
  generating a control signal using a controller communicatively coupled to the plurality of MZIs of the reconfigurable quantum processing unit, the control signal altering a phase setting of at least one of the plurality of MZIs;
  releasing a photon from the quantum memory into the reconfigurable quantum processing unit such that the released photon traverses the reconfigurable quantum processing unit, wherein the released photon comprises the quantum information of the absorbed photon; and
  measuring a quantum property of one or more released photons using a photon detector, wherein the quantum property corresponds with at least a portion of a computational task, wherein:
    absorbing the photon received by the quantum memory excites an atomic ensemble state of the quantum memory from a first energy state into a second energy state; and
    releasing a photon comprising the quantum information of the absorbed photon occurs upon return of the atomic ensemble state of the quantum memory to the first energy state.

22. The method of claim 21, wherein return of the atomic ensemble state of the quantum memory to the first energy state occurs in response to a control signal received from the controller.

23. A method of performing a computational task, the method comprising:
  directing one or more photons into a reconfigurable quantum processing unit comprising a plurality of Mach-Zehnder interferometers (MZIs) such that at least one of the one or more photons traverse the reconfigurable quantum processing unit;
  absorbing, using a quantum memory of a quantum memory array, a photon received by the quantum memory from the reconfigurable quantum processing unit, the received photon comprising quantum information, wherein the quantum memory array comprises a plurality quantum memories optically coupled to the plurality of MZIs of the reconfigurable quantum processing unit;
  generating a control signal using a controller communicatively coupled to the plurality of MZIs of the reconfigurable quantum processing unit, the control signal altering a phase setting of at least one of the plurality of MZIs;
  releasing a photon from the quantum memory into the reconfigurable quantum processing unit such that the released photon traverses the reconfigurable quantum processing unit, wherein the released photon comprises the quantum information of the absorbed photon; and
  measuring a quantum property of one or more released photons using a photon detector, wherein the quantum property corresponds with at least a portion of a computational task, wherein:
    the quantum memory array comprises a first quantum memory array;
    the reconfigurable quantum processing unit is positioned between and optically coupled to the first quantum memory array and a second quantum memory array;
    the photon detector is part of an optical node, the optical node further comprising an optical switch positioned between and optically coupled to a photon source and the photon detector;
    the optical node is an individual optical node of an optical node array; and the optical node array is disposed between the reconfigurable quantum processing unit and the first quantum memory array such that photons that propagate from the reconfigurable quantum processing unit to the first quantum memory array traverse the optical switch of an individual optical node of the optical node array.

24. The method of claim 23, wherein each quantum memory of the first quantum memory array and the second quantum memory array are configured to release photons by backward emission such that photons released by both the first quantum memory array and the second quantum memory array are directed toward the reconfigurable quantum processing unit.

25. The method of claim 23, wherein measuring a quantum property of one or more released photons comprises directing a photon toward the photon detector using the optical switch, wherein the optical switch of each individual optical node is configured to selectively direct photons toward the first quantum memory array, the reconfigurable quantum processing unit, and the photon detector of the individual optical node.

\* \* \* \* \*